Sept. 14, 1937.  F. W. ANDERSON  2,093,181
SHEET METAL CAN
Filed Oct. 13, 1936
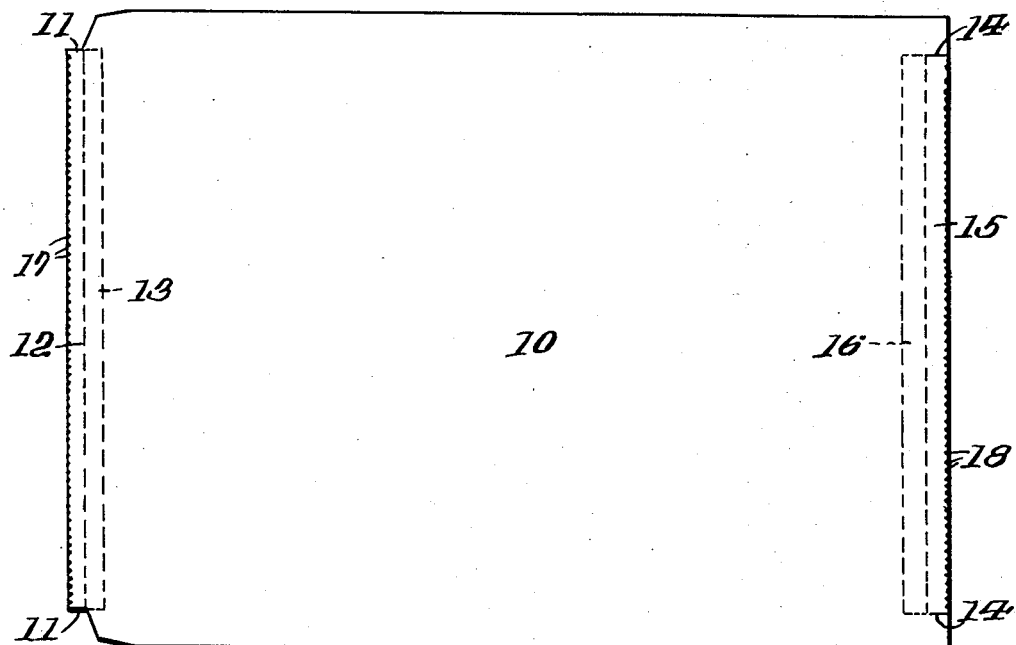
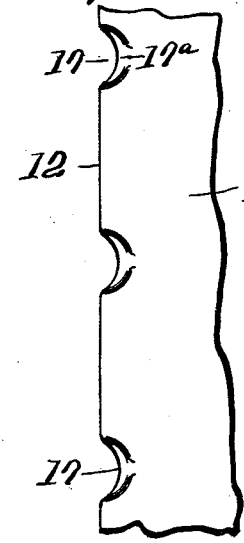
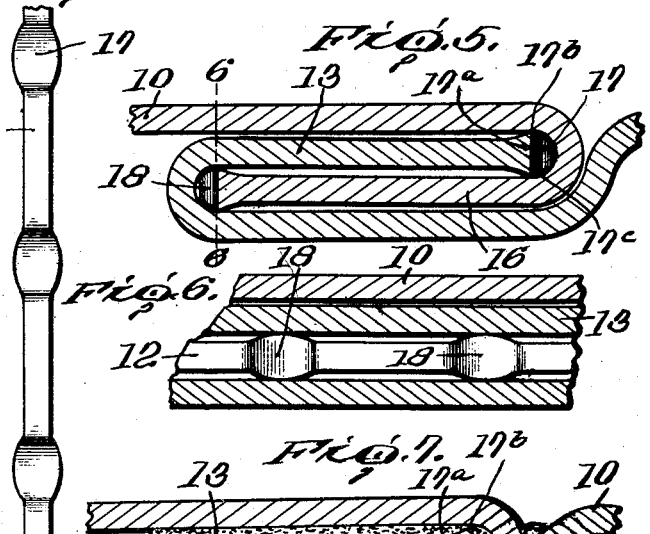
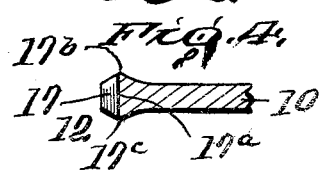
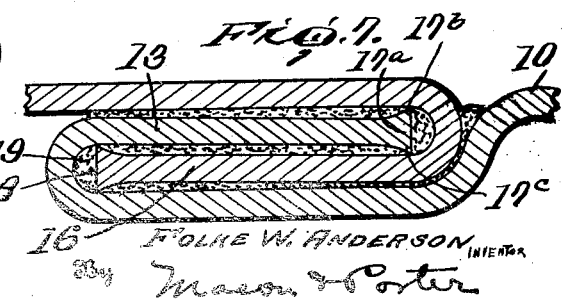

Patented Sept. 14, 1937

2,093,181

UNITED STATES PATENT OFFICE 2,093,181

SHEET METAL CAN

Folke Waldemar Anderson, Chicago, Ill., assignor to Continental Can Company, Inc., New York, N. Y., a corporation of New York Application October 13, 1936, Serial No. 105,437

3 Claims. (Cl. 220—76)

The invention relates to new and useful improvements in sheet metal cans and more particularly to the side seam for joining the edge portions of the can body. In making a can body from a sheet metal, it is a common practice to shape a body blank so that when the side edges are brought together to form the seam, the latter will have lapping sections at the ends of the can body which are to be flanged, and interlocking hook portions extending from one lapping section to the other. The interlocked hook portions are bumped and a solder bond applied thereto. The solder flows by capillary attraction into the interlocked portions. Considerable difficulty has been experienced in obtaining an efficient solder bonding of the parts, due to the fact that the gases forming are trapped ahead of the flowing solder which prevents the solder from reaching the extreme limits of the seam.

An object of the above invention is to provide a construction of the hook portions which makes it impossible for the gases to become trapped, thus permitting the unimpeded flow of the solder to all parts of the seam.

In the drawing which shows by way of illustration one embodiment of the invention—

Figure 1 is a plan view of a sheet metal body blank for forming a can body which embodies the invention;

Fig. 2 is a very much enlarged plan view of a portion of one edge of the blank showing one of the indentations formed by knurling the edge;

Fig. 3 is an edge view of the same;

Fig. 4 is a sectional view on the line 4—4 of Fig. 2;

Fig. 5 is an enlarged sectional view through the side seam showing the hook portions interlocked and bumped preparatory to soldering;

Fig. 6 is a sectional view on the line 6—6 of Fig. 5; and

Fig. 7 is a view similar to Fig. 5, but showing the solder bond as applied to the seam.

In carrying out the invention, a sheet of metal is shaped so as to provide a body blank 10. This body blank is notched as indicated at 11 so as to form an offset portion 12, and this offset portion 12 is turned back to form a hook portion 13 which is indicated in dotted lines in Fig. 1. The other edge portion of the blank is formed with slits 14, 14, and this offsets a portion 15 which is turned back to form a hook 16 which is likewise indicated in dotted lines in Fig. 1. This shaping of the body blank to form interlocking hooks with end portions which are lapped, is the usual form of body blank and further description of the manner of forming the hook portions and interlocking and bumping the same is not thought necessary.

The body blank before the hooks are formed is subjected to the action of a knurling tool. This forms indentations along the edge of the hook portion 12, which indentations are indicated at 17. Indentations are also formed along the edge of the hook portion 15 and these are indicated at 18. The indentations are similar in construction. The knurling of the edge portion of the body blank may be accomplished in a body maker by rollers having projecting ribs or teeth which contact with the edge portion and force the metal back into the body blank, thus producing the indentations.

In Figures 2 to 4 of the drawing, one of the indentations 17 is shown on an enlarged scale. It is noted that the metal is crowded back into the body blank as indicated at 17a, and this provides a raised ridge 17b which projects above the upper face of the body blank. There is a similar projecting portion 17c at the lower face of the body blank.

The indentations 18 are similarly shaped. While it is preferred to form these indentations with a knurling tool, it will be understood that they may be formed by any suitable mechanism. It is essential, however, that the metal shall be forced back into the body blank and out of the plane of the side faces of the body blank.

When the hook portions are interlocked and the seam bumped, the projecting portion 17b contacts with the inner face of the hook 16 adjacent the bend 16a in the metal which forms the hook. The projecting portion 17c engages the inner face of the body blank adjacent this bent portion 16a. As noted above, the indentations are similar to the indentation 17, and there is a projecting portion 18b which contacts with the inner face of the body blank adjacent the bend 13a which forms the hook 13. There is also a projecting portion 18c which contacts with the inner face of the hook 13 adjacent this bend. These projecting portions are spaced from each other along the edge as clearly shown in Figures 1 and 6 of the drawing, and the projections serve to prevent tight contact between the adjacent surfaces of the metal parts along the ends of the respective hooks. These spaces are clearly shown in Fig. 6. It also prevents tight contact between the adjacent side faces of the hooks and the outer faces of the hooks and the body blank.

When solder is applied along the base of the hook 13, it will flow by capillary attraction in between the adjacent faces of the metal parts, and any gases forming through the heat of the solder re-acting on the flux, or any air which is trapped in the pockets formed in the seam will be forced out of the seam. The gases can readily pass from the space between the hook 13 and the body blank and allow the solder to follow around into the space between the two hooks and so on until the entire seam is filled with solder and a strong, firm solder bond provided. The solder is indicated at 19 in the drawing.

This knurling of the edge provides a means whereby the gases are free to escape and the molten solder will flow unimpeded throughout the entire region of the side seam for solder bonding the parts. Therefore, the knurling of the edges increases the strength of the side seam as it eliminates the possibility of voids or islands in the bond of solder. The more perfect the bond, the stronger the seam is the result.

It is obvious that minor changes in the details of construction can be made without departing from the spirit of the invention as set forth in the appended claims.

Having thus described the invention, what I claim as new and desire to secure by Letters-Patent, is—

1. A metal can body having the edge portions joined by interlocking hooks, the edge of each hook having spaced relatively small indentations therein providing portions projecting laterally from the side faces of the hooks, said projecting portions operating to space the metal parts to permit the free flow of the solder for bonding the side seam.

2. A metal can body having the edge portions joined by interlocking hooks, the edge of each hook having spaced notches formed by pressing the metal inwardly from the edge so as to produce portions projecting laterally from the side faces of the hook, said projecting portions operating to space the metal parts to permit the free flow of the solder for bonding the side seam.

3. A soldered side seam for sheet metal bodies, said seam comprising two reversely disposed flanges interlocked to form four layers of metal with three solder spaces therebetween, at least one of said flanges having spaced portions projecting laterally from a surface of said flange, said projecting portions substantially contacting an adjacent layer of metal and the remaining surface of said flange being spaced from said adjacent layer.

FOLKE WALDEMAR ANDERSON.